United States Patent Office 3,449,411
Patented June 10, 1969

3,449,411
PROCESS FOR THE PRODUCTION OF TRANS-4-AMINOMETHYLCYCLOHEXANE - 1-CARBOXYLIC ACID
Takeo Naito, Ichikawa-shi, and Atsuji Okano and Tosaku Miki, Tokyo, Japan, assignors to Daiichi Seiyaku Company, Limited, Tokyo, and Mitsubishi Chemical Industries Limited, Tokyo, Japan, both corporations of Japan
No Drawing. Filed Apr. 26, 1965, Ser. No. 451,045
Claims priority, application Japan, May 15, 1964, 39/27,137; July 9, 1964, 39/39,319
Int. Cl. C07c 99/00
U.S. Cl. 260—514                                                16 Claims

ABSTRACT OF THE DISCLOSURE

An alkali or alkaline earth metal salt of 4-N-acetamidomethylbenzoic acid is reduced with heating under pressure in the presence of Raney-nickel catalyst in an atmosphere of hydrogen to produce an alkali or alkaline earth metal salt of 4-N-acetamidomethylcyclohexane-1-carboxylic acid, and then subjecting the product to a hydrolysis-conversion reaction by heating it at 160–250° C. with an alkali agent, thereby accomplishing both the deacetylation and the transformation of the stereo conformation simultaneously to produce trans-4-aminomethylcyclohexane-1-carboxylic acid.

---

The present invention relates to a process for the production of trans-4-aminoethylcyclohexane-1-carboxylic acid.

An object of the present invention is to provide an improved and economical process for producing trans-4-aminomethylcyclohexane-1-carboxylic acid which has significant value as an antiplasmic agent.

Other objects and advantageous features of the present invention will appear from the following detailed description.

So far, 4-aminomethylcyclohexane-1-carboxylic acid has been known as a valuable substance for pharmaceutical use, and it is specifically pointed out in Belgian Patent No. 617,216 and British Patent No. 949,512 that the compound has an antiplasmic activity and an excellent therapeutic effect on disorders caused by the activated plasmin in vivo. However, the present inventors found that there exist two stereo isomers of the compound and that the trans-isomer has a far stronger antiplasmic activity than the cis-isomer.

In the reaction of preparing 4-aminomethylcyclohexane-1-carboxylic acid by reducing the benzene nucleus of 4-aminomethylbenzoic acid, Raney-nickel such as any Raney-nickel of W–1 to W–7 (cited in the following references: "The Journal of the American Chemical Society," vol. 68, p. 1471 (1946), vol. 69, p. 3040 (1947) and vol. 70, p. 695 (1948) and "Organic Syntheses," vol. 21, p. 15 (1941)) is far more convenient than platinum as a catalyst to be utilized industrially. It was recognized, however, that if the reduction is carried out using Raney-nickel upon 4-aminomethylbenzoic acid with its amino group and carboxyl group unprotected, the reaction diverges from the main purpose to give only a small amount of the desired product.

The present inventors have further executed numerous experiments and studies and have now developed a profitable process of the present invention for producing trans-4-aminomethylcyclohexane-1-carboxylic acid.

In the process of the present invention, the amino group of 4-aminomethylbenzoic acid is protected with acetyl group and the carboxyl group thereof is in the form of an alkali or alkaline earth metal salt, that is, an alkali or alkaline earth metal salt of 4-N-acetamidomethylbenzoic acid is used as the starting material.

The process of the present invention may be represented by the following reaction formula:

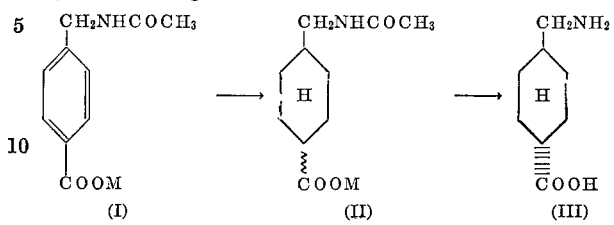

wherein M stands for an alkali metal such as sodium or potassium, or alkaline earth metal such as calcium or barium.

The process comprises reducing an alkali or alkaline earth metal salt of 4-N-acetamidomethylbenzoic acid (I) with heating under pressure in the presence of Raney-nickel catalyst in an atmosphere of hydrogen to produce an alkali or alkaline earth metal salt of 4-N-acetamidomethylcyclohexane-1-carboxylic acid (II), and then subjecting the product, either isolating it as the free acid (M.P. 130–160° C.) or not isolating it, to a hydrolysis-conversion reaction by heating it at 160–250° C. with an alkali metal hydroxide, alkaline earth metal oxide or hydroxide to produce trans-4-aminomethylcyclohexane-1-carboxylic acid (III), thereby accomplishing both the deacetylation and the transformation of the stereo conformation simultaneously.

The catalytic reduction step of the present invention is carried out by shaking in an autoclave the compound (I) and Raney-nickel catalyst such as any Raney-nickel of W–1 to W–7 in a solvent such as water, an aliphatic lower alcohol having 1 to 2 carbon atoms or a mixture thereof at 120 to 200° C., preferably 160 to 180° C. for 1–5 hrs. in an atmosphere of hydrogen, the initial pressure of which being 40–100 atmospheric pressure, thereby the theoretical amount of hydrogen is absorbed. Then, the produced alkali or alkaline earth metal salt of 4-N-acetamidomethylcyclohexane-1-carboxylic acid (II) is, either being isolated as its free acid or not beng isolated, subjected to the next reaction.

The second step of the process of the present invention is carried out by heating at 180–250° C. in an autoclave the isolated product or the reaction mixture obtained above for 8–16 hrs. with an aqueous solution of an alkali metal hydroxide such as sodium or potassium hydroxide; an alkaline earth metal oxide such as calcium oxide or barium oxide; or an alkaline earth metal hydroxide such as calcium hydroxide or barium hydroxide, thereby both the deactetylation and the transformation of the stereo conformation are effected simultaneously to produce the desired trans-4-aminomethylcyclohexane - 1 - carboxylic acid. The amount of an alkali metal hydroxide or an alkaline earth metal oxide or hydroxide should be such to be necessary and enough to hydrolyze the acetal group, for example, about 1–1.2 mol equivalent of the amount of the compound (II).

Thereafter, the treatment is carried out as follows in order to remove inorganic ions:

(1) When an alkali metal salt of 4-N-acetamidomethylbenzoic acid is used as the starting material and/or a caustic alkali is used as the hydrolyzing-transforming agent;

The reaction mixture containing trans-4-aminomethylcyclohexane-1-carboxylic acid is passed through a column of a strong cation ionexchange resin, for example Diaion SK #1 (H type) (tradename of Mitsubishi Chemical Industries Limited, Japan). Then 5% of aqueous ammonia is poured into the column to eluate trans-4-aminomethylcyclohexane-1-carboxylic acid. In this case, when potassium salt of 4-N-acetamidomethylbenzoic acid is used as the starting material and potassium hydroxide is used as the hydrolyzing-transforming agent, the procedure may be conveniently simplified as follows. The above treatment with an ion-exchange resin is not necessary. That is, the difference in solubility between the produced potassium acetate and potassium salt of the desired product can be utilized, and the potassium acetate can be removed by dissolution in methanol.

(2) When an alkaline earth metal salt of 4-N-acetamidomethylbenzoic acid is used as the starting material and/or an alkaline earth metal oxide or hydroxide is used as the hydrolyzing -transforming agent; Before the treatment with the ion-exchange resin, the following procedure is necessary. An equivalent amount of an acid which is capable of forming a sparingly soluble alkaline earth metal salt with the alkaline earth metal is added to the reaction mixture to remove the alkaline earth metal ion contained therein. As the acid, for example, sulfuric acid or oxalic acid is used and the alkaline earth metal ion contained in the reaction mixture is removed as, for example, barium sulfate or calcium oxalate. In this case, when the alkaline earth metal salt of 4-N-acetamidomethylbenzoic acid and the alkaline earth metal oxide or hydroxide are used, the step of the treatment with the ion-exchange resin may be omitted. The filtrate is concentrated and the residue is recrystallized from water-acetone or water-acetone-methanol to give crystals of trans-4-aminomethylcyclohexane-1- carboxylic acid.

Trans-4-aminomethylcyclohexane - 1 - carboxylic acid which has the stero conformation:

is a colorless powder having the melting point of 380–390° C. (decomp. uncorrect. in air bath) and has characteristic infra-red absorption at 1637, 1535 and 1383 cm.$^{-1}$.

Certain salts of trans-4-aminomethylcyclohexane-1-carboxylic acid have the following melting points:

HCl salt ($C_8H_{15}NO_2 \cdot HCl$)—238–240° C. (decomp.)
HBr salt ($C_8H_{15}NO_2 \cdot HBr$)—227–229° C. (decomp.)
Au salt ($C_8H_{15}NO_2 \cdot HCl \cdot AuCl_3$)—204–206° C. (decomp.)
Pt salt (($C_8H_{15}NO_2 \cdot HCl)_2PtCl_4$)—254–255° C. (decomp.)

Cis-isomer which has the stero conformation:

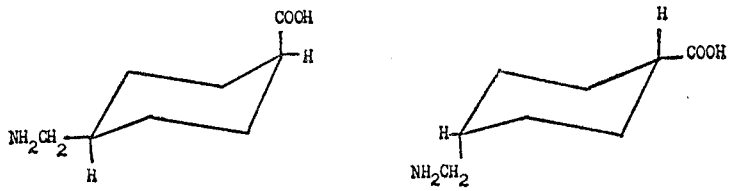

is a colorless powder having the melting point of 238–242° C. (decomp.) and has characteristic infra-red absorptions at 1640, 1565, 1515, 1415 and 1310 cm.$^{-1}$.

Trans-4-aminomethylcyclohexane-1-carboxylic acid is soluble in six times its volume of water at room temperature but is insoluble in methanol. Furthermore, the hydrochloric acid salt of cis-4-aminomethylcyclohexane-1-carboxylic acid is more soluble in methanol than that of trans-4-aminomethylcyclohexane-1-carboxylic acid.

Trans-4-aminomethylcyclohexane - 1 - carboxylic acid produced by the process of the present invention has a potent inhibitory action on the plasmin system, and also an excellent therapeutic effect on disorders associated with and/or caused by the activated plasmin in vivo, without any accompanying noticeable toxicity when applied.

Some preferred embodiments of the present invention will be described in detail wherein the examples given are for the purpose of illustrating preferred embodiments only and not for the purpose of limiting the same.

Example 1

In an aqueous solution prepared by dissolving 0.8 g. (0.02 mol) of sodium hydroxide in 20 ml. of water, 3.9 g. (0.02 mol) of 4-N-acetamidomethylbenzoic acid was dissolved to make a neutral solution. In this solution, 1 g. of Raney-nickel catalyst was suspended, and the suspension was shaken in an autoclave at 170° C. for two hours in an atmosphere of hydrogen, the initial pressure of which is 82 atmosphere pressure (at room temperature), thereby the theoretical amount of hydrogen was absorbed. After cooling, the catalyst was removed by filtration. To the filtrate, 0.96 g. (0.024 mol) of sodium hydroxide was added, and in an autoclave the solution was heated at 190–200° C. for 16 hours. The reaction solution was poured into a column of 150 ml. of a strong cation ion-exchange resin, Diaion SK #1. The column was washed with water, and then trans-4-aminomethylcyclohexane-1-carboxylic acid was eluated with 5% of aqueous ammonia. This ammoniacal eluate (positive in the Ninhydrin Reaction) was concentrated to dryness, and the residue was recrystallized from water-acetone or water-alcohol to give 2.25 g. (yield: 71%) of crystals of trans-4-aminomethylcyclohexane-1-carboxylic acid which melt at 380–390° C. (decomp.).

Analysis for $C_8H_{15}O_2N$: Calculated percent C, 61.12; H, 9.62; N, 8.91. Found percent C, 61.10; H, 9.52; N, 8.58.

Example 2

In an aqueous solution prepared by dissolving 1.1 g. (0.02 mol) of potassium hydroxide in 30 ml. of water, 3.9 g. (0.02 mol) of 4-N-acetamidomethylbenzoic acid was dissolved to make a neutral solution. In this aqueous solution, 1 g. of Raney-nickel catalyst was suspended, and the suspension was shaken in an autoclave at 170–180° C. for about 2 hours in an atmosphere of hydrogen, the initial pressure of which was 90 atmospheric pressure, thereby the theoretical amount of hydrogen was absorbed. After cooling, the catalyst was removed by filtration. To the filtrate, 1.35 g. (0.024 mol) of potassium hydroxide was added, and in an autoclave the solution was heated at 190–200° C. for 18 hours. After cooling, 1.45 g. (0.024 mol) of glacial acetic acid was added to the reaction solution to neutralize it, and then concentrated under reduced pressure. To the residue, 15 ml. of methanol was added to remove produced potassium acetate by dissolution. The residue was further treated twice with methanol to give crystalline powder. This powder gives, upon recrystallization from water-acetone, 2.36 g. (yield: 75%) of colorless crystals of trans-4-aminomethylcyclohexane-1-carboxylic acid which melt at 380–390° C. (decomp.). This product agreed well with an authentic sample in respect to both infra-red spectrum and melting point.

Example 3

In 30 ml. of water, 3.9 g. (0.02 mol) of 4-N-acetamidomethylbenzoic acid and 3.15 g. (0.01 mol) of barium hydroxide were suspended, 1 g. of Raney-nickel catalyst was added to this suspension, and the reduction was carried out until the theoretical amount of hydrogen was absorbed. The catalyst was removed by filtration from the reaction mixture and the filtrate was concentrated to dryness. To the residue, 1.2 ml. of water and 0.96 g. (0.024 mol) of sodium hydroxide were added, and the mixture was heated in an autoclave at 190–200° C. for 16 hours. To the reaction solution, 100 ml. of water was added, and, while warm, the theoretical amount of dilute sulfuric acid was added to precipitate barium sulfate. After cooling, the barium sulfate was filtered, and the filtrate was treated with a strong cation ion-exchange resin in the same manner as in Example 1 to give 2.55 g. (yield: 81%) of colorless crystals of trans-4-aminomethylcyclohexane-1-carboxylic acid which melt at 380–390° C. (decomp.).

Example 4

In 50 ml. of water, 3.9 g. (0.02 mol) of 4-N-acetamidomethylbenzoic acid and 0.74 g. of calcium hydroxide were suspended, and 1 g. of Raney-nickel catalyst was added thereto. The mixture is shaken in an autoclave at 180° C. for an hour in an atmosphere of hydrogen, the initial pressure of which being 99 atmosphere pressure. The reaction solution was concentrated under reduced pressure, 1.35 g. (0.024 mol) of potassium hydroxide was added thereto and in an autoclave the mixture was heated at 190–200° C. for 18 hours. To the reaction solution, 50 ml. of water was added, and then the theoretical amount of oxalic acid was added thereto. The precipitated calcium oxalate was removed by filtration and the filtrate was treated with a strong ion-exchange resin in the same manner as in Example 1 to give 2.08 g. (yield: 66%) of colorless crystals of trans-4-aminomethylcyclohexane-1-carboxylic acid which melt at 380–390° C. (decomp.).

Example 5

In 30 ml. of water, 3.9 g. (0.02 mol) of 4-N-acetamidomethylbenzoic acid and 3.15 g. (0.01 mol) of barium hydroxide were suspended. In an autoclave, 1 g. of Raney-nickel catalyst was added thereto, and the mixture was shaken at 170–180° C. for an hour in an atmosphere of hydrogen, the initial pressure of which being 98 atmospheric pressure, thereby the theoretical amount of hydrogen was absorbed. The catalyst was removed by filtration, and the filtrate was concentrated under reduced pressure to dryness. To the residue, 12 ml. of water and 4.7 g. (0.015 mol) of barium hydroxide were added, and the mixture was heated in an autoclave at 200° C. for 15 hours. To the reaction solution, 100 ml. of water was added, and, while warm, the theoretical amount of dilute sulfuric acid was added thereto to precipitate barium sulfate. After cooling, the precipitate was removed by filtration. The filtrate was condensed and the precipitated crystals were recrystallized from water-acetone. They were again recrystallized from water-methanol-acetone to give 2.55 g. (yield: 81%) of trans-4-aminomethylcyclohexane-1-carboxylic acid which melts at 380–390° C. (decomp.). The product agreed well with an authentic sample in respect to infra-red spectrum, melting point and the characteristics of its derivatives.

Example 6

In 50 ml. of water, 3.9 g. (0.02 mol) of 4-N-acetamidomethylbenzoic acid and 0.74 g. of calcium hydroxide were suspended. In an autoclave, 1 g. of Raney-nickel was added thereto, and the mixture was shaken at 180° C. for an hour in an atmosphere of hydrogen, the initial pressure of which being 99 atmospheric pressure. The reaction mixture was concentrated to 20 ml., 0.85 g. (0.015 mol) of calcium oxide was suspended therein, and the mixture was heated in an autoclave at 200° C. for 15 hours. To the reaction solution, 50 ml. of water was added, and then the theoretical amount of oxalic acid was added thereto to precipitate calcium oxalate. The precipitate was removed by filtration, and the filtrate was treated in the same manner as in Example 1 to give 1.6 g. (yield: 51%) of trans-4-aminomethylcyclohexane-1-carboxylic acid which melts at 380–390° C. (decomp.).

What is claimed is:

1. A process for producing trans-4-aminomethylcyclohexane-1-carboxylic acid or a salt thereof which comprises catalytically reducing a salt selected from the group consisting of an alkali and alkaline earth metal salt of 4-N-acetamidomethylbenzoic acid by heating at 120–200° C. in an autoclave in a solvent selected from the group consisting of water, an aliphatic lower alcohol and a mixture thereof in the presence of Raney-nickel catalyst in an atmosphere of hydrogen, the initial pressure of which being 40–100 atmospheres, to produce a corresponding salt of 4-N-acetamidomethylcyclohexane-1-carboxylic acid; heating in an autoclave the product obtained above at 180–250° C. for 8–16 hours with an aqueous solution of an alkali selected from the group consisting of an alkali metal hydroxide, an alkaline earth metal oxide and hydroxide; and recovering trans-4-aminomethylcyclohexane-1-carboxylic acid from the reaction mixture.

2. A process according to claim 1, in which an alkali metal is a member selected from the group consisting of sodium and potassium.

3. A process according to claim 1, in which an alkaline earth metal is a member selected from the group consisting of barium and calcium.

4. A process according to claim 1, in which the intermediate, a salt of 4-N-acetamidomethylcyclohexane-1-carboxylic acid is, without being isolated, directly subjected to the next reaction.

5. A process for producing trans-4-aminomethylcyclohexane-1-carboxylic acid or a salt thereof which comprises catalytically reducing potassium 4-N-acetamidomethylbenzoate by heating at 120–200° C. in an autoclave in water in the presence of Raney-nickel catalyst in an atmosphere of hydrogen, the initial pressure of which being 40–100 atmospheres, to produce potassium 4-N-acetamidomethylcyclohexane-1-carboxylate; heating in an autoclave the product obtained above at 180–250° C. for 8–16 hours with an aqueous solution of potassium hydroxide; adding glacial acetic acid to the reaction mixture to neutralize it; concentrating the mixture; and adding thereto methanol to dissolve produced potassium acetate, whereby trans-4-aminomethylcyclohexane-1-carboxylic acid remains undissolved.

6. A process according to claim 5, in which the intermediate, potassium 4-N-acetamidomethylcyclohexane-1-carboxylate is, without being isolated, directly subjected to the next reaction.

7. A process for producing trans-4-aminomethylcyclohexane-1-carboxylic acid or a salt thereof which comprises catalytically reducing sodium 4-N-acetamidomethylbenzoate by heating at 120–200° C. in an autoclave in water in the presence of Raney-nickel catalyst in an atmosphere of hydrogen, the initial pressure of which being 40–100 atmospheres, to produce sodium 4-N-acetamidomethylcyclohexane-1-carboxylate; heating in an autoclave the product obtained above at 180–250° C. for 8–16 hours with an aqueous solution of sodium hydroxide; passing the reaction mixture through a column of a strong cation ion-exchange resin; and eluating trans-4-aminomethylcyclohexane-1-carboxylic acid with an aqueous ammonia.

8. A process according to claim 7, in which the intermediate, sodium 4-N-acetamidomethylcyclohexane-1-carboxylic acid is, without being isolated, directly subjected to the next reaction.

9. A process for producing trans-4-aminomethylcyclohexane-1-carboxylic acid or a salt thereof which comprises catalytically reducing a member selected from the group consisting of barium and calcium 4-N-acetamidomethylbenzoic acid be heating at 120–200° C. in an autoclave in water in the presence of Raney-nickel catalyst in an atmosphere of hydrogen, the initial pressure of which being 40–100 atmospheric pressure, to produce a corresponding alkaline earth metal salt of 4-N-acetamidomethylcyclohexane-1-carboxylic acid; heating in an autoclave the product obtained above at 180–250° C. for 8–16 hours with an aqueous solution of a member selected from the group consisting of barium oxide, calcium oxide, barium hydroxide, and calcium hydroxide; adding an acid selected from the group consisting of sulfuric acid and oxalic acid to the reaction mixture to precipitate a corresponding alkaline earth metal salt of the acid; filtering the salt and obtaining trans-4-aminomethyl-cyclohexane-1-carboxylic acid from the filtrate.

10. A process according to claim 9, in which the intermediate, an alkaline earth metal salt of 4-N-acetamidomethylcyclohexane-1-carboxylic acid is, without being isolated, directly subjected to the next reaction.

11. A process for producing trans-4-aminomethylcyclohexane-1-carboxylic acid or a salt thereof which comprises providing a solution in a solvent selected from the group consisting of water, aliphatic lower alcohol and mixture thereof, of a salt selected from the group of alkali and alkaline earth metal salt of 4-N-acetamido-methyl-benzoic acid; heating said solution in an atmosphere of hydrogen in the presence of a hydrogenation catalyst under super-atmospheric pressure, whereby a salt of said acid is formed; then introducing into said solution an alkali selected from the group consisting of alkali metal hydroxide and alkaline earth metal oxide and hydroxide, heating said mass under superatmospheric pressure for a sufficient length of time to form said trans carboxylic acid.

12. A process according to claim 11 in which the pressure in the first step is about 40–100 atmospheres.

13. A process according to claim 11 in which the catalyst is Raney-nickel.

14. A process according to claim 11 in which the temperature in the first step is about 120–200° C.

15. A process according to claim 11 in which the temperature in the second step is about 180–250° C.

16. A process according to claim 11 in which the time of heating in the second step is about 8–16 hours.

References Cited

UNITED STATES PATENTS 2,771,487    11/1956    Morris et al. _____ 260—514

OTHER REFERENCES

Vogel, A. I., Practical Organic Chemistry, 1957, p. 576–77.

Calmon, C., and Kressman, T. R., Ion Exchangers in Organic and Biochemistry, 1957, chapter 35.

Remy, H., Treatise in Inorganic Chemistry, vol. 1, Elsewier—1956, pg. 278–283 and 452–43.

LORRAINE A. WEINBERGER, *Primary Examiner.*

P. J. KILLOS, *Assistant Examiner.*

U.S. Cl. X.R.

260—999